Dec. 5, 1967 — D. SCARAMUCCI — 3,356,333
VALVE SEAT WITH LIP-LIKE SEAL
Filed April 5, 1965 — 2 Sheets-Sheet 1

INVENTOR.
DOMER SCARAMUCCI
BY Dunlap & Laney
ATTORNEYS

Dec. 5, 1967   D. SCARAMUCCI   3,356,333
VALVE SEAT WITH LIP-LIKE SEAL
Filed April 5, 1965                                    2 Sheets-Sheet 2
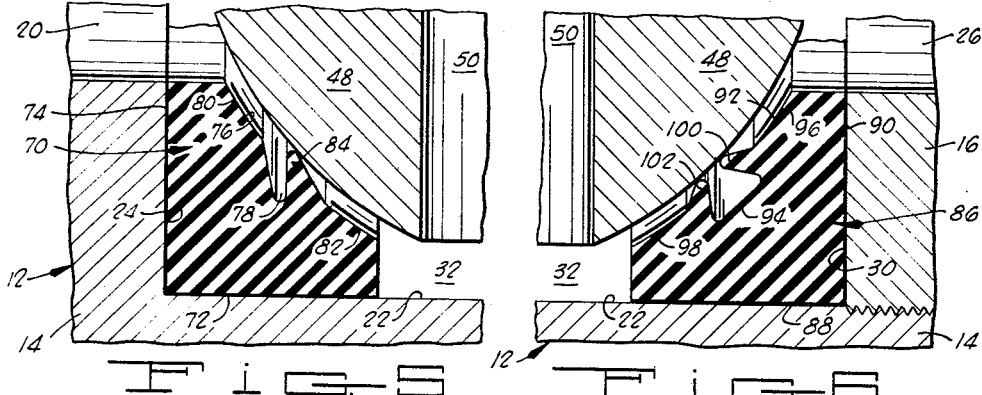
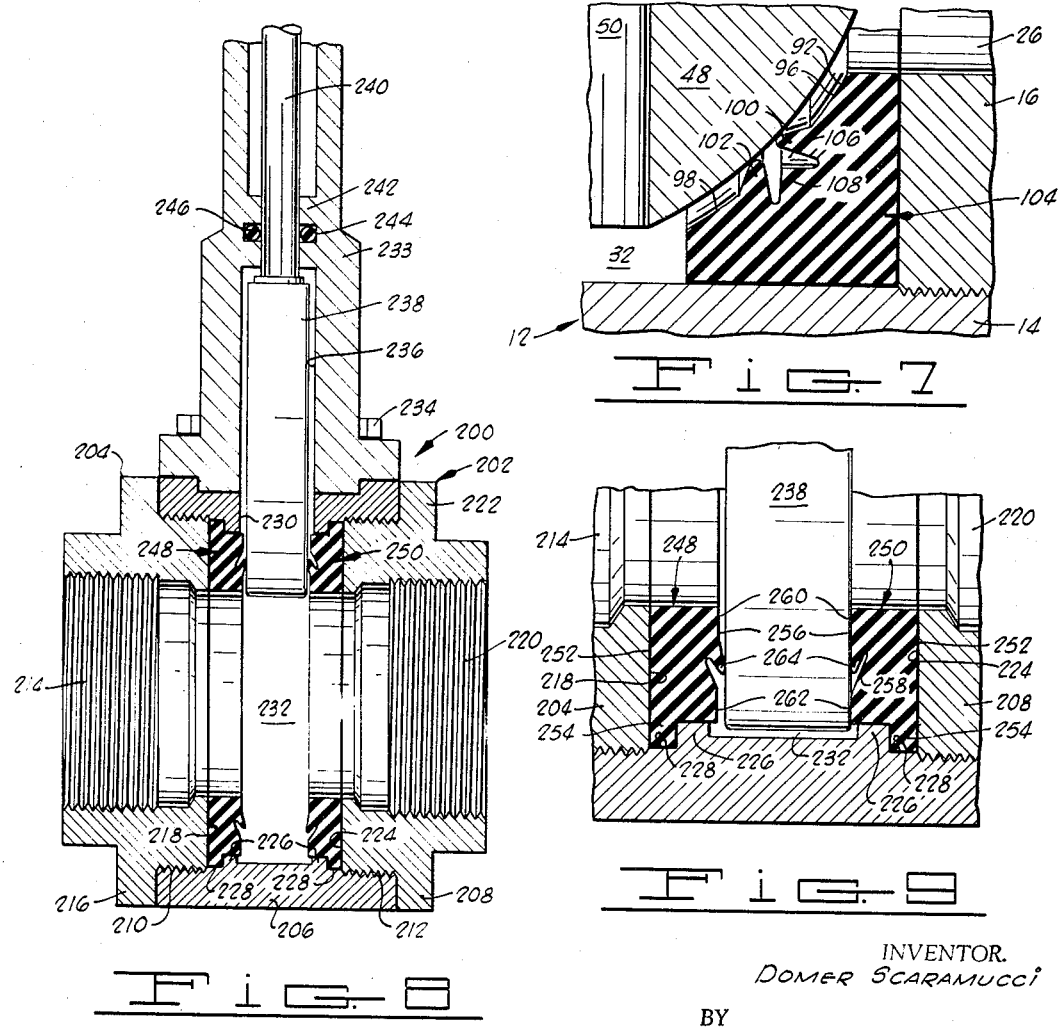
INVENTOR.
DOMER SCARAMUCCI
BY
Dunlap & Laney
ATTORNEYS

United States Patent Office 3,356,333
Patented Dec. 5, 1967

3,356,333
VALVE SEAT WITH LIP-LIKE SEAL
Domer Scaramucci, 3245 S. Hattie,
Oklahoma City, Okla. 73129
Filed Apr. 5, 1965, Ser. No. 445,508
20 Claims. (Cl. 251—172)

ABSTRACT OF THE DISCLOSURE

A molded plastic valve seal ring having an annular groove in the seating face thereof dividing the seating face into two annular, substantially inflexible seat portions. A flexible lip is molded to the inner seat portion and projects angularly from the respective seat portion over the groove to be responsive to pressure in the valve body for sealing against the valve member. A second flexible lip may be molded to the outer seat portion if the seal is to be used as an upstream seal.

---

This invention relates generally to improved valves and valve seals for controlling fluid flow through conduits and the like. More particularly, but not by way of limitation, this invention relates to an improved valve having novel seals therein for controlling fluid flow through a conduit or the like.

One of the ultimate goals of the valve manufacturing industry is to produce a valve that provides a fluid-tight closure regardless of whether the valve is being used with high or low pressure fluids. It is desirable that the valve be produced at a reasonable cost so that it is competitive with presently manufactured valves.

Unfortunately, the design and construction of a valve that provides a fluid-tight closure at both high and low pressures and that can be economically produced has presented several problems that have not been, heretofore, satisfactorily solved. For example complete closure at low pressures has been obtained by valves incorporating seals constructed from relatively soft materials. Such valves have not proved satisfactory in high pressure service due to the lack of structural strength of the relatively soft seals and also due to the tendency of high pressures to extrude the seals from the valves. In an effort to alleviate the foregoing problems, some valve manufacturers have incorporated one or more relatively rigid sealing members in the seal structure for the purpose of preventing the soft seal materials from extruding from the valve and also to provide a structurally strong seat upon which the valve member can rest when the valve is closed against relatively high pressures.

Another approach taken by some manufacturers in seeking a solution to the aforesaid problems, has been to manufacture the seals from a relatively rigid material, such as one of the resilient synthetic resins or relatively hard natural or synthetic rubber. The harder seal materials have proved effective in supporting the valve member in high pressure service and have been relatively effective in forming high pressure fluid-tight seals. However, seals constructed from relatively hard materials have not proved entirely satisfactory because of their inability to form fluid-tight seals when the valve is used in relatively low pressure service.

This invention provides an improved valve including a valve body having an inlet, an outlet, and a chamber connecting the inlet and outlet to form a passageway through the valve body; a valve member disposed in the chamber and movable therein from a position wherein the valve is open to a position wherein the valve is closed; and, at least one annular seal member disposed in the chamber and encircling the outlet. The annular seal member includes an annular groove therein adjacent the valve member, a seat portion on each side of the groove for supportingly engaging the valve member, and a lip portion projecting angularly from the seat portion, between the valve member and groove, and into sealing engagement with the valve member when the valve member is in engagement with the seat portions.

This invention also contemplates an improved valve seal comprising an annular resilient body having an annular groove in one surface thereof forming a pair of spaced, annular seat portions and a flexible, annular lip portion projecting angularly from one of the seat portions over a portion of the annular groove.

One object of the invention is to provide an improved valve that assures an effective fluid-tight closure when used with either high or low pressure fluids.

Another object of the invention is to provide an improved valve that provides a fluid-tight closure at both high and low pressures and can be quickly, easily and economically manufactured.

A further object of the invention is to provide an improved valve having improved seals therein constructed from a relatively hard material that form effective high and low pressure seals.

Still another object of the invention is to provide an improved valve having seals therein that provide an effective upstream seal when used with either high or low pressure fluids.

A further object of the invention is to provide an improved valve having improved seals therein that provide both upstream and downstream seals when used with either high or low pressure fluids.

An additional object of the invention is to provide an improved valve having improved seals therein that provide an effective downstream seal when used with high or low pressure fluids.

One other object of the invention is to provide an improved seal for use in valves that can be quickly, easily and economically manufactured.

One further object of the invention is to provide an improved valve seal that, when installed in a valve, provides an effective seal when used with both high and low pressure fluids.

The foregoing and additional objects and advantages of the invention will become more apparent when the following description is read in conjunction with the accompanying drawings wherein like reference characters denote like parts in all views and wherein:

FIG. 5 is a cross-sectional view similar to FIG. 3 but illustrating a modified version of the seal shown in FIG 3;

FIG. 6 is a cross-sectional view similar to FIG. 3, but illustrating still another embodiment of seal also constructed in accordance with the invention;

FIG. 7 is a cross-sectional view similar to FIG. 6, but illustrating a modification of the seal illustrated in FIG. 6;

FIG. 8 is a vertical cross-sectional view illustrating a gate valve also constructed in accordance with the invention; and, FIG. 9 is an enlarged cross-sectional view of a portion of the gate valve of FIG. 8 illustrating the seal structure in more detail.

Figure 1:
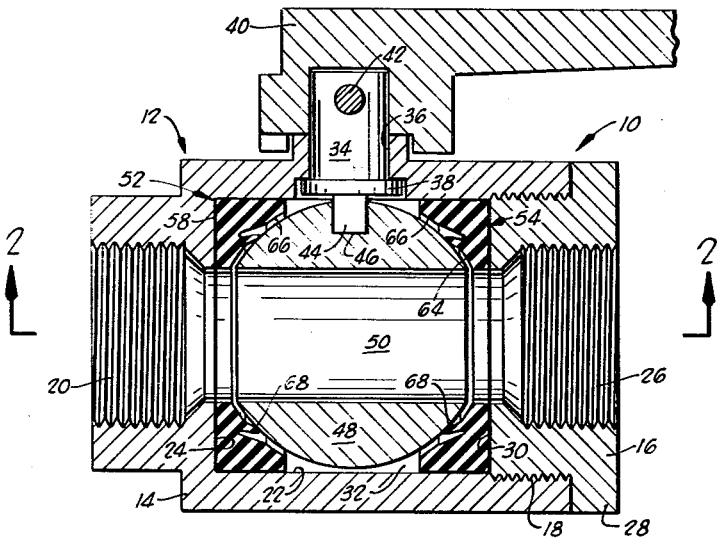
FIG. 1 is a vertical cross-sectional view of a ball valve constructed in accordance with the invention.

Embodiment of FIG. 1

Referring to the drawing and to FIGS. 1 through 4 in particular, shown therein is a ball valve, generally designated by the reference character 10, and constructed in accordance with the invention. The ball valve 10 includes a valve body 12 having an inlet portion 14 and an outlet portion 16 threadedly connected as shown at 18.

The inlet portion 14 includes a partially threaded inlet 20 and an enlarged bore 22 forming a shoulder 24 therein. The outlet portion 16 includes a partially threaded outlet 26, a peripheral flange 28, arranged to abut the end of the inlet portion 14 to position an interior end 30 of the outlet portion 16 in the inlet portion 14. The bore 22, shoulder 24 and end 30 cooperate to form a chamber 32 in the valve body 12.

An operating member 34 extends through an opening 36 in the inlet portion 14 of the valve body 12 and has a peripheral flange 38 located near the lower end thereof in engagement with the valve body 12 to limit the upward movement of the operating member 34 therein. The upper end of the operating member 34 is connected to an operating handle 40 by a pin 42. The lower-most end 44 on the operating member 34 is rectangularly configured to fit within a rectangular slot 46 in a valve ball 48 that is disposed in the chamber 32.

Figure 2:
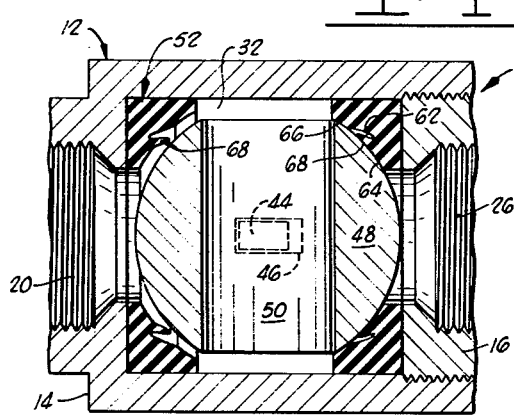
FIG. 2 is a cross-sectional view of the valve of FIG. 1, taken along the line of 2—2 of FIG. 1.

As shown most clearly in FIG. 2, the slot 46 (shown in dash lines) is longer than the rectangular end 44 (also shown in dash lines) to permit movement of the valve ball 48 in the chamber 32 when the valve ball 48 is in the closed position. The valve ball 48 also has a passage 50 extending therethrough that cooperates with the inlet 20 and outlet 26 to form a flow passageway extending through the valve body 12 when the valve ball 48 is positioned in the valve 10 as shown in FIG. 1.

An annular upstream seal 52 is disposed in the chamber 32 between the valve ball 48 and valve body 12 and encircling the inlet 20. An annular downstream seal 54 that is identical in construction to the upstream seal 52 is also disposed in the chamber 32 but oppositely oriented therein. The downstream seal 54 encircles the outlet 26 between the valve ball 48 and the valve body 12.

Figure 3:
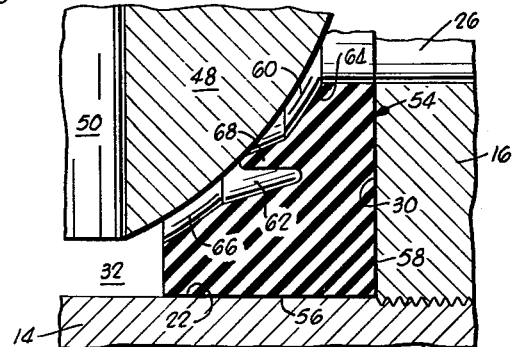
FIG. 3 is an enlarged cross-sectional view of a portion of the valve of FIG. 1 illustrating in more detail the structure of a seal installed therein.

FIG. 3 illustrates the structure of the seal 54 in enlarged detail and will, therefore, be used for the purpose of describing the structure of both the upstream seal 52 and the downstream seal 54. As shown therein, the seal includes a peripheral surface 56 that is in engagement with the enlarged bore 22 of the valve body 12. An end surface 58 of the seal 54 lies in a plane perpendicular to the peripheral surface 56 and is in engagement with the end 30 of the outlet portion 16 of the valve body 12. As shown in FIGS. 1 and 2, the corresponding surface 58 of the upstream seal 52 is in engagement with the shoulder 24 formed in the inlet portion of the valve body 12.

The seal 54 also includes a surface 60 that has a configuration complimentary to the exterior surface of the valve ball 48. The surface 60 is provided with an annular groove 62 located near the medial portion thereof dividing the surface 60 into a seat portion 64, disposed adjacent the flow passageway extending through the ball valve 10, and a seat portion 66, disposed relatively remote from the flow passageway in the valve 10. A flexible lip portion 68 projects angularly from the seat portion 64 over a portion of the groove 62 and relatively toward the valve ball 48. As illustrated in FIGS. 1 and 3, the lip portion 68 is in sealing engagement with the outer surface of the valve ball 48.

In a preferred form of the invention, the seals 52 and 54 are constructed from a relatively hard and resilient synthetic resin, such as nylon, Teflon, or Delrin. Other elastomers, such as natural or synthetic rubber, may also be used satisfactorily. The specific composition, hardness and resiliency of the material used to construct the seals depends upon the intended service in which the valve 10 is to be utilized.

Operation of the embodiment of FIG. 1

As illustrated in FIG. 1, the valve 10 is in the open or full flow position, that is, the passage 50 in the valve ball 48 is aligned with the inlet 20 and the outlet 26 in the valve body 12. As shown therein, the valve ball 48 is held in a relatively centered position in the valve body 12 due to its engagement with the projecting lip portions 68 of the upstream and downstream seals 52 and 54, respectively.

To close the valve 10, the handle 40, connected operating member 34 and valve ball 48 are rotated ninety degrees (90°) from the position shown in FIG. 1 into a position as illustrated substantially by FIG. 3. With the valve ball 48 in this position, it can be seen that the passage 50 in the valve ball 48 is disposed at right angles to the flow passageway through the valve 10.

When a relatively low pressure is applied in the inlet 20 with the valve 10 closed, fluid in the inlet 20 deforms the lip portion 68 of the upstream seal 52 relatively away from the ball 48 so that fluid flows from the inlet 20 into the chamber 32 in the valve body 12. Fluid in the chamber 32 flows past the seat portion 66 of the downstream seal 54 and into the annular groove 62 of the downstream seal 54. The fluid in the groove 62 exerts a force on the lip portion 68 of the downstream seal 54 moving it into tighter sealing engagement with the valve ball 48, thereby augmenting the sealing engagement between the ball 48 and lip portion 68. Thus, it can be seen that at low pressures, the pressure responsiveness of the lip portion 68 on the downstream seal 54 is effective to form a fluid-tight downstream seal with the ball 48 to provide a complete closure of the valve 10.

Figure 4:
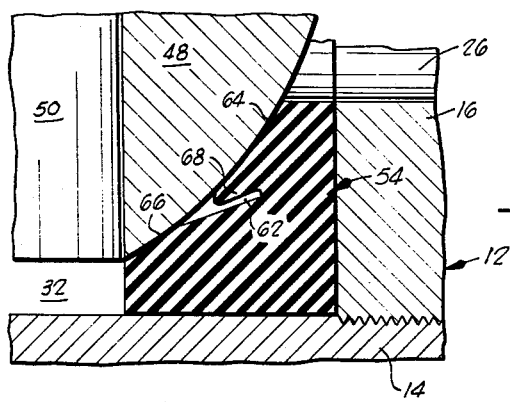
FIG. 4 is a cross-sectional view similar to FIG. 3, but illustrating the seal in another operational position.

When relatively high fluid pressures are present in the inlet 20, the fluid exerts a force on the valve ball 48, moving the valve ball 48 relatively toward the outlet 26 into the position illustrated in FIG. 2 and more clearly in FIG. 4. As shown therein, the valve ball 48 has moved a sufficient distance downstream so that its exterior is in engagement with the seat portions 64 and 66 of the downstream seal 54. The flexible lip portion 68 of the downstream seal 54 is deformed into the groove 62 when the valve ball 48 is in engagement with the seat portions 64 and 66.

When the valve ball 48 is in the position shown in FIGS. 2 and 4, fluid flows past the upstream seal 52 into the chamber 32 in the valve body 12. The seat portion 66 of the downstream seal 54 is not intended to serve as a sealing surface, but it is in engagement with the exterior surface of the valve ball 48 and may form a fluid-tight seal therewith. If the pressure in the chamber 32 is sufficiently high, fluid flows between the exterior of the valve ball 48 and the seat portion 66 into the annular groove 62 exerting a force on the flexible and pressure responsive lip portion 68 moving the lip portion 68 into tighter sealing engagement with the valve ball 48, thereby augmenting the sealing engagement therebetween. From the foregoing, it can be perceived that the downstream seal 54 will provide a complete closure on the downstream side of the valve 10 even when subjected to relatively high pressures.

With the valve ball 48 in engagement with the seat portions 64 and 66, the downstream seal 54 provides a relatively large area supportingly engaging the valve ball 48 to carry the loads imposed thereon by the fluid pressure in the chamber 32. It should also be pointed out that if the pressure in the chamber 32 is sufficiently high, the resilient material of the downstream seal 54 will be deformed until the lip portion 68 engages the bottom of the groove 62. The engagement of the lip portion 68 with the bottom of the groove 62 prevents further relative movement therebetween, thereby providing additional load bearing area to support the valve ball 48.

Embodiment of FIG. 5

FIG. 5 illustrates a modification of the seals generally designated by the reference character 70. It should be understood that the seal 70 can be used in lieu of the upstream seal 52 (see FIG. 1) or in lieu of both the upstream seal 52 and downstream seal 54. The material used in constructing the seal 70 is the same as described in connection with the seals 52 and 54.

As illustrated in FIG. 5, the seal 70 includes a peripheral surface 72 in engagement with the bore 22 in the valve body 12, a surface 74 lying in a plane perpendicular to the surface 72 in engagement with the shoulder 24, and a surface 76 adjacent the valve ball 48 configured to conform to the exterior surface thereof. An annular groove 78 is provided near the medial portion of the surface 76, dividing the surface 76 into a seat portion 80 disposed adjacent the flow passageway through the valve 10 and a seat portion 82 disposed relatively remote from the flow passageway therethrough. A flexible annular lip portion 84 projects angularly from the seat portion 82 over a portion of the annular groove 78 and relatively toward the valve ball 48.

With the valve ball 48 in the closed position, as illustrated in FIG. 5, fluid under pressure in the inlet 20 passes between the seat portion 80 and the valve ball 48 into the groove 78. Fluid under pressure in the groove 78 exerts a force on the lip portion 84 moving it into tighter sealing engagement with the valve ball 48 to form a fluid-tight upstream seal in the valve 10.

It can be perceived from viewing FIGS. 1 and 5 that if the seal 70 is substituted for the upstream seal 52, the valve 10 includes seals 70 and 54 that form a fluid-tight upstream seal and a fluid-tight downstream seal, respectively. If both the upstream and downstream seals 52 and 54, respectively, are each replaced by a seal 70, a fluid-tight upstream seal will be effected in the valve 10 regardless of whether the fluid pressure is applied from the inlet 20 or from the outlet 26. The provision of the two seals 70 also prevents the movement of fluid from the flow passageway through the valve 10 into the chamber 32.

Embodiment of FIG. 6

FIG. 6 illustrates the structure of a seal generally designed by the reference character 86 and also constructed in accordance with the invention. It is intended that the seal 86 will be utilized in the valve 10 in lieu of either or both of the seals 52 and 54 illustrated in FIG. 1. Also, the seal 86 is constructed from the materials described previously in connection with the description of the seals 52 and 54.

As shown in FIG. 6, the seal 86 includes a peripheral surface 88 that is in engagement with the bore 22 of the valve body 12, a surface 90 that lies in a plane extending perpendicular to the surface 88 and in engagement with the end 30 of the outlet portion 16 of the valve body 12, and a surface 92 disposed adjacent the valve ball 48 and configured complimentary to the exterior surface of the valve ball 48. An annular groove 94 extends around the seal 86, dividing the surface 92 into a seat portion 96 disposed adjacent the flow passageway extending through the valve 10 and a seat portion 98 located on the surface 92 and relatively remote from the passageway extending through the ball valve 10.

A flexible, annular lip portion 100 projects angularly from the seat portion 96 over a portion of the annular groove 94 and relatively toward valve ball 48. A second flexible, annular lip portion 102 projects angularly from the seat portion 98 over a portion of the annular groove 94 and relatively toward the valve ball 48. As illustrated, the lip portions 100 and 102 each sealingly engage the exterior surface of the valve ball 48.

With the valve ball 48 in the closed position as illustrated in FIG. 6 and assuming a differential in pressure to exist across the valve 10 from the inlet 20 to the outlet 26, fluid in the chamber 32 flows past the seat portion 98, deforms the lip portion 102 relatively away from the surface of valve ball 48 and passes thereby into the annular groove 94. Fluid in the groove 94 exerts a force on the flexible lip portion 100 moving it into tighter sealing engagement with the valve ball 48, thereby augmenting the seal previously existing therebetween.

If a differential in pressure exists across the valve 10 from the outlet 26 to the inlet 20, fluid in the outlet 26 flows between the surface of the valve ball 48 and the seat portion 96 deforming the flexible lip portion 100 relatively away from the valve ball 48 and flowing into the annular groove 94. Fluid in the groove 94, influenced by the higher pressure in the outlet 26, exerts a force on the flexible lip portion of 102 moving it into tighter sealing engagement with the surface of the valve ball 48, thereby augmenting the previously existing seal between the lip portion 102 and the valve ball 48. Thus, it can be perceived that the seal 86 provides both an upstream and downstream fluid-tight seal with the valve ball 48.

The substitution of a pair of the seals 86 for the upstream and downstream seals 52 and 54, respectively, in the valve 10, provides a valve capable of obtaining a complete shutoff regardless of the direction that pressure is applied to the valve 10. In such an arrangement, it can be appreciated that the seal 86 encircling the inlet 20 prevents the flow of fluid from the inlet 20 into the chamber 32 and also prevents the flow of fluid from the chamber 32 into the inlet 20. Similarly, the seal 86 encircling the outlet 26 forms a fluid-tight seal with the valve ball 48 to prevent fluid from flowing from the outlet 26 into the chamber 32 or from the chamber 32 into the outlet 26.

FIG. 7 illustrates a slight modification of the seal 86 and is generally designated by the reference character 104. The seal 104 is constructed from the materials described in connection with the seals 52 and 54 and is identical to the seal 86 in all respects, except in the specific configuration of the annular groove 94.

The seal 104 includes an annular groove 106 that is bifurcated to define an annular land 108 extending into the groove 106. The seal 104 has a greater load bearing area and therefore is more resistant to deformation under high pressures than the seal 86 illustrated in FIG. 6.

The greater load bearing quality of the seal 104 results from the engagement of the flexible lip portions 100 and 102 with the land 108 when the valve ball 48 moves into engagement with the seat portions 96 and 98. When the valve ball 48 is in engagement with the seat portions 96 and 98 of the seal 104, it can be appreciated that almost the entire surface 92 thereon is supporting the load of the valve ball 48.

Due to the identical configuration of the lip portions 100 and 102 of the seals 86 and 104, their function is identical with respect to forming a fluid-tight seal with the valve ball 48. With the exception of the greater load bearing characteristics of the seal 104, the seals 86 and 104 are entirely interchangeable in their function and operation.

Embodiment of FIG. 8

FIG. 8 illustrates a gate valve generally designated by the reference character 200 and also constructed in accordance with the invention. As shown therein, the valve 200 includes a valve body 202 including an inlet portion 204, a medial portion 206 and an outlet portion 208.

The inlet portion 204 is connected to the medial portion 206 by threads 210 and the outlet portion 208 is connected to the medial portion 206 by threads 212. The inlet portion 204 includes a partially threaded inlet 214 and an annular flange 216 that engages the medial portion 206 to position an end surface 218 of the inlet portion 204 in the valve body 202. The outlet portion 208 includes a partially threaded outlet 220 and a peripheral flange 222 that is engageable with the other end of the medial portion 206 to position an end surface 224 thereon in the valve body 202.

The medial portion 206 includes a pair of spaced annular lugs 226 in the interior thereof, cooperating with the end surfaces 218 and 224 in the inlet and outlet portions 204 and 208, respectively, to form a pair of spaced, annular recesses 228. The medial portion 206 also includes an opening 230 extending transversely therethrough for purposes that will be described more fully herein after.

The end surfaces 218 and 224 of the inlet portion 204 and outlet portion 208, respectively, cooperate with the interior of the medial portion 206 to define an enlarged chamber 232 therein. The inlet 214 and outlet 220 and the chamber 232 form a flow passageway extending through the valve 200.

A hollow extension 233 is connected with the medial portion 206 by a plurality of fasteners 234 and has an opening 236 in the lower end thereof in register with the opening 230 in the medial portion 206. The openings 230 and 236 are sized to receive a valve gate 238. The upper end of the valve gate 238 is connected to a valve operating rod 240 that extends upwardly therefrom into threaded engagement with a valve operating handle (not shown) as is well known to those familiar with the structure of gate valves.

To prevent the leakage of fluid from the valve body 202, the extension 233 is provided with an interior flange 242 having an annular groove 244 therein. A resilient annular seal 246, such as an O-ring, is disposed in the annular groove 244 in sealing engagement with the valve operating rod 240.

An annular upstream seal 248 is disposed in the chamber 232 encircling the inlet 214. An identical, though oppositely disposed, annular downstream seal 250 is positioned in the chamber 232 encircling the outlet 220. The seals 248 and 250 are constructed from the same materials described for constructing the seals 52 and 54 of FIG. 1.

The structural details of the upstream seal 248 and downstream seal 250 may be more clearly seen in FIG. 9. As shown therein, each of the seals includes a surface 252. The surface 252 of the upstream seal 248 is disposed in engagement with the end surface 218 of the inlet portion 204 and the surface 252 of the downstream seal 250 is disposed in engagement with the end surface 224 of the outlet portion 208. Each of the seals also includes a peripheral flange 254 disposed in the recesses 228 to retain the seals 248 and 250 in the valve body 202. A surface 256 on the seals 248 and 250 is disposed adjacent the valve gate 238 when the valve gate 238 is in the closed position as illustrated in FIG. 9.

The surface 256 has an annular groove 258 formed in the medial portion thereof, dividing the surface 256 into a seat portion 260 adjacent the flow passageway through the valve 200 and a seat portion 262 located relatively remote from the flow passageway through the valve 200. Each of the seals 248 and 250 also includes a flexible lip portion 264 that projects angularly from the seat portion 260 between the groove 258 and the gate 238 and relatively toward the valve gate 238.

*Operation of the embodiment of FIG. 8*

As illustrated in FIG. 8, the valve 200 is in the open or full flow position, that is, with the valve gate 238 positioned in the opening 236 in the extension 233 and out of the flow passageway through the valve 200. The fragmentary view illustrated in FIG. 9 shows the valve 200 in the closed position, that is, with the valve gate 238 lowered into a position wherein the flow passageway extending through the valve 200 is blocked thereby.

If the fluid pressure in the inlet 204 is relatively low, the valve gate 238, when in the closed position, is in sealing engagement with the flexible lip portions 264 on the upstream and downstream seals 248 and 250, respectively. Due to the configuration of the lip portions 264, fluid flows from the inlet 214 past the lip portion 264 on the upstream seal 248 into the chamber 232. Fluid in the chamber 232 then flows past the seat portion 262 on the downstream seal 250 into the annular groove 258. The fluid in the annular groove 258 exerts a force on the lip portion 264 moving the lip portion 264 into tighter sealing engagement with the valve gate 238, thereby augmenting the seal between the lip portion 264 and the valve gate 238.

If the pressure of the fluid in the inlet 214 is relatively high, the valve gate 238 is moved relatively toward the outlet 220 and into engagement with the seat portions 260 and 262 of the downstream seal 250 as shown in FIG. 9. When the valve gate 238 is in engagement with the seat portions 260 and 262, the flexible lip portion 264 is deformed into the annular groove 258. Due to the presence of relatively high pressure in the inlet 214, the flexible lip portion 264 on the upstream seal 248 is moved away from the valve gate 238, whereupon the fluid flows into the chamber 232. Fluid passing between the seat portion 262 of the downstream seal 250 and the valve gate 238 enters the annular groove 258 forcing the lip portion 264 on the downstream seal 250 into a tighter sealing engagement with the valve gate 238. Thus, it can be seen that the downstream seal 250 is effective to form a fluid-tight seal assuring complete closure of the valve 200 when used with either high or low pressure fluids.

If it is desired to form an upstream seal in the valve 200, the configuration illustrated in FIG. 5, that is, a seal structure having the flexible lip portion projecting relatively toward the flow passageway instead of in the direction illustrated in FIG. 9, is installed in the valve 200. Similarly, the other previously described seal forms are equally applicable to the construction of a seal for the gate valve 200.

While each of the valves has been described as having an inlet on one side and an outlet on the other and the seal function described relative thereto, it should be apparent that the seals will work equally well if the fluid flow through the valves is in the reverse direction. Also, it should be readily apparent to those skilled in the art that the various seal forms described may be applied with equal success to valves having the valve members, e.g. gate or ball, fixed or guided against movement along the flow passageway. Stated in another way, the seal forms may be used with equal success in a ball valve wherein the ball is mounted for rotation only in the valve body. Similarly, the seals may be successfully used in gate valves wherein the valve gate is guided by the valve body and thereby prevented from moving along the flow passageway.

It should be readily apparent from the foregoing detailed description that seals constructed in accordance with the invention, even when constructed from relatively hard materials, provide effective low and high pressure seals while at the same time providing a large seating area to support the load on the valve member resulting from pressure in the valve. The seals described hereinbefore can be quickly, easily, and economically produced by well known manufacturing procedures.

It should be understood that the embodiments described herein are presented by way of example only and that many changes and modifications thereto can be made without departing from the spirit of the invention or from the scope of the annexed claims.

What is claimed is:
1. A valve comprising:
   a valve body having an inlet, an outlet, and a chamber connecting said inlet and outlet to form a passageway through said body;
   a valve member movably disposed in said chamber, said valve member being movable from a position opening said passageway to a position closing said passageway; and,
   an annular seal member disposed in said chamber and encircling said outlet, said seal member having an annular groove therein adjacent said valve member, a relatively inflexible seat portion disposed on each side of said groove to supportingly engage said valve member, and a flexible lip portion projecting angularly from the seat portion closest to said passageway, between said valve member and groove, and into sealing engagement with said valve member when said valve member is in engagement with said seat portions;

said lip portion having a length less than the width of said groove and being responsive to the pressure of fluid entering said groove between said valve member and the seat portion remote from said passageway to be forced into tighter sealing engagement with said valve member.

2. A valve comprising:
a valve body having an inlet, an outlet, and a chamber connecting said inlet and outlet to form a passageway through said body;

a valve member movably disposed in said chamber, said valve member being movable from a position opening said passageway to a position closing said passageway; and, an annular seal member disposed in said chamber and encircling said inlet, said seal member having
an annular groove therein adjacent said valve member,
a relatively inflexible seat portion disposed on each side of said groove to supportingly engage said valve member, and
a flexible lip portion projecting angularly from the seat portion most remote from said passageway, between said valve member and groove, and into sealing engagement with said valve member when said valve member is in the position closing said passageway;
said lip portion having a length less than the width of said groove and being responsive to the pressure of fluid entering said groove between said valve member and the seat portion closest to said passageway to be forced into tighter sealing engagement with said valve member.

3. A valve comprising:
a valve body having an inlet, an outlet, and a chamber connecting said inlet and outlet to form a passageway through said body;

a valve member movably disposed in said chamber, said valve member being movable from a position opening said passageway to a position closing said passageway; and, a pair of annular seal members disposed in said chamber, one of said seal members encircling said outlet and the other seal member encircling said inlet, each of said seal members having
an annular groove therein adjacent said valve member,
a relatively inflexible seat portion on each side of said groove engageable with said valve member, and
a flexible lip portion sealingly engageable with said valve member and projecting angularly from one of said seat portions relatively toward said valve member and between said valve member and said annular groove;
said lip portion having a length less than the width of said groove and being responsive to the pressure of fluid entering said groove between said valve member and the other of said seat portions to be forced into tighter sealing engagement with said valve member.

4. The valve of claim 3 wherein each of said seal members has a second flexible lip portion projecting angularly from the other seat portion relatively toward said valve member and over a portion of said annular groove, said second flexible lip portion being sealingly engageable with said valve member and deformable into said annular groove upon engagement of said valve member with said seat portions.

5. The valve of claim 3 wherein said seal members are constructed from an elastomer.

6. The valve of claim 3 wherein said seal members are constructed from a resilient synthetic resin.

7. The valve of claim 3 wherein said flexible lip portion on each of said seal members projects from the seat portion closest to the passageway through said valve body.

8. The valve of claim 3 wherein said flexible lip portion on each of said seal members projects from the seat portion most remote from the passageway through said valve body.

9. A ball valve comprising:
a valve body having an inlet, an outlet, and a chamber connecting said inlet and outlet;

a valve ball rotatably disposed in said chamber, said valve ball having a passage extending therethrough and being rotatable from a position wherein said valve is open and said passage is aligned with said inlet and outlet to a position wherein said valve is closed; and, an annular seal member disposed in said chamber and encircling said outlet, said seal member having
an annular groove therein adjacent said valve ball,
a relatively inflexible seat portion disposed on each side of said groove to supportingly engage said valve ball, and
a flexible lip portion projecting angularly from the seat portion closest to said passageway, between said valve ball and groove, and into sealing engagement with said valve ball when said valve ball is in engagement with said seat portions;
said lip portion having a length less than the width of said groove and being responsive to the pressure of fluid entering said groove between said valve ball and the seat portion remote from said passageway to be forced into tighter sealing engagement with said valve member.

10. A ball valve comprising:
a valve body having an inlet, an outlet, and a chamber connecting said inlet and outlet;

a valve ball rotatably disposed in said chamber, said valve ball having a passage extending therethrough and being rotatable from a position wherein said valve is open and said passage is aligned with said inlet and outlet to a position wherein said valve is closed; and, an annular seal member disposed in said chamber and encircling said inlet, said seal member having
an annular groove therein adjacent said valve ball,
a relatively inflexible seat portion disposed on each side of said groove to supportingly engage said valve ball, and
a flexible lip portion projecting angularly from the seat portion most remote from said passageway, between said valve ball and groove, and into sealing engagement with said valve ball when said valve ball is in engagement with said seat portions;
said lip portion having a length less than the width of said groove and being responsive to the pressure of fluid entering said groove between said valve ball and the seat portion closest to said passageway to be forced into tighter sealing engagement with said valve ball.

11. A ball valve comprising:
a valve body having an inlet, an outlet, and a chamber connecting said inlet and outlet;

a valve ball rotatably disposed in said chamber, said valve ball having a passage extending therethrough and being rotatable from a position wherein said valve is open and said passage is aligned with said inlet and outlet to a position wherein said valve is closed; and, a pair of annular seal members disposed in said chamber, one of said seal members encircling said outlet and the other seal member encircling said inlet, each of said seal members having an annular groove therein adjacent said valve ball,
a relatively inflexible seat portion on each side of said groove adapted to supportingly engage said valve ball, and
a flexible lip portion projecting angularly from one of said seat portions relatively toward said valve ball and between said valve ball and said groove, said lip portion sealingly engaging said valve ball when said valve ball engages said seat portions;
said lip portion having a length less than the width of said groove and being responsive to the pressure of fluid entering said groove between said valve ball and the other of said seat portions to be forced into tighter sealing engagement with said valve ball.

12. The ball valve of claim 9 wherein said seal members are constructed from an elastomer and wherein said lip portions project from the seat portions closest to the inlet and outlet in said valve body.

13. A ball valve comprising:
a valve body having an inlet, an outlet, and a chamber connecting said inlet and outlet;
a valve ball rotatably disposed in said chamber, said valve ball having a passage extending therethrough and being rotatable from a position wherein said valve is open and said passage is aligned with said inlet and outlet to a position wherein said valve is closed; and,
a pair of annular seal members disposed in said chamber, one of said seal members encircling said outlet and the other seal member encircling said inlet, each of said seal members having
an annular groove therein adjacent said valve ball,
a seat portion on each side of said groove for supportingly engaging said valve ball, and
a flexible lip portion projecting angularly from each of said seat portions relatively toward said valve ball and between said valve ball and said groove, said lip portions sealingly engaging said valve ball when said valve ball engages said seat portions.

14. A gate valve comprising:
a valve body having an inlet, an outlet, and a chamber connecting said inlet and outlet to form a flow passageway through said valve body;
a valve gate movably positioned in said chamber, said gate being movable from a position closing said flow passageway to a position wherein said flow passageway is open; and,
an annular seal member disposed in said chamber and encircling said outlet, said seal member having
an annular groove therein adjacent said gate,
a relatively inflexible seat portion on each side of said groove for supportingly engaging said gate, and
a flexible lip portion projecting angularly from the seat portion closest to said flow passageway, said lip portion being disposed between said gate and groove and in sealing engagement with said gate when said gate is in engagement with said seat portion;
said lip portion having a length less than the width of said groove and being responsive to the pressure of fluid entering said groove between said gate and the seat portion remote from said passageway to be forced into tighter sealing engagement with said gate.

15. A gate valve comprising:
a valve body having an inlet, an outlet, and a chamber connecting said inlet and outlet to form a flow passageway through said valve body;
a valve gate movably positioned in said chamber, said gate being movable from a position closing said flow passageway to a position wherein said flow passageway is open; and,
a pair of annular seal members disposed in said chamber, one of said seal members encircling said outlet and the other encircling said inlet, each of said seal members having
an annular groove therein adjacent said gate,
a relatively inflexible seat portion on each side of said groove for supportingly engaging said gate, and
a flexible lip portion projecting angularly from the seat portion closest to said flow passageway, said lip portion being disposed between said gate and groove and in sealing engagement with said gate when said gate is in engagement with said seat portions;
said lip portion having a length less than the width of said groove and being responsive to the pressure of fluid entering said groove between said gate and the seat portion remote from said passageway to be forced into tighter sealing engagement with said gate.

16. A valve seal comprising an annular resilient body having:
an annular groove in one surface thereof forming a pair of spaced, relatively inflexible, annular seat portions having seating surfaces adapted to engage the surface of a valve member; and,
a flexible lip portion projecting angularly from one of said seat portions over a portion of said annular groove extending, in the relaxed condition thereof, outwardly from said groove beyond the seating surfaces of the seat portions.

17. The valve seal of claim 16 wherein said body is constructed from an elastomer.

18. The valve seal of claim 16 wherein said body is constructed from a resilient synthetic resin.

19. A valve seal comprising an annular resilient body having:
an annular groove in one surface thereof forming a pair of spaced, relatively inflexible, annular seat portions having seating surfaces adapted to engage the surface of a valve member; and,
a flexible lip portion projecting angularly from each of said seat portions over a portion of said annular groove extending, in the relaxed condition thereof, outwardly from said groove beyond the seating surfaces of the seat portions.

20. The valve seal of claim 19 wherein said body is constructed from a resilient synthetic resin.

References Cited

UNITED STATES PATENTS

| | | | |
|---|---|---|---|
| 2,295,160 | 9/1942 | Christenson | 277—205 X |
| 2,907,596 | 10/1959 | Maha | 277—205 |
| 2,945,666 | 7/1960 | Freeman | 251—172 |
| 3,235,224 | 2/1966 | Grove | 251—315 X |
| 3,273,855 | 9/1966 | Wells | 251—328 |

WILLIAM F. O'DEA, *Primary Examiner.*

HAROLD WEAKLEY, *Examiner.*